Figure 1:
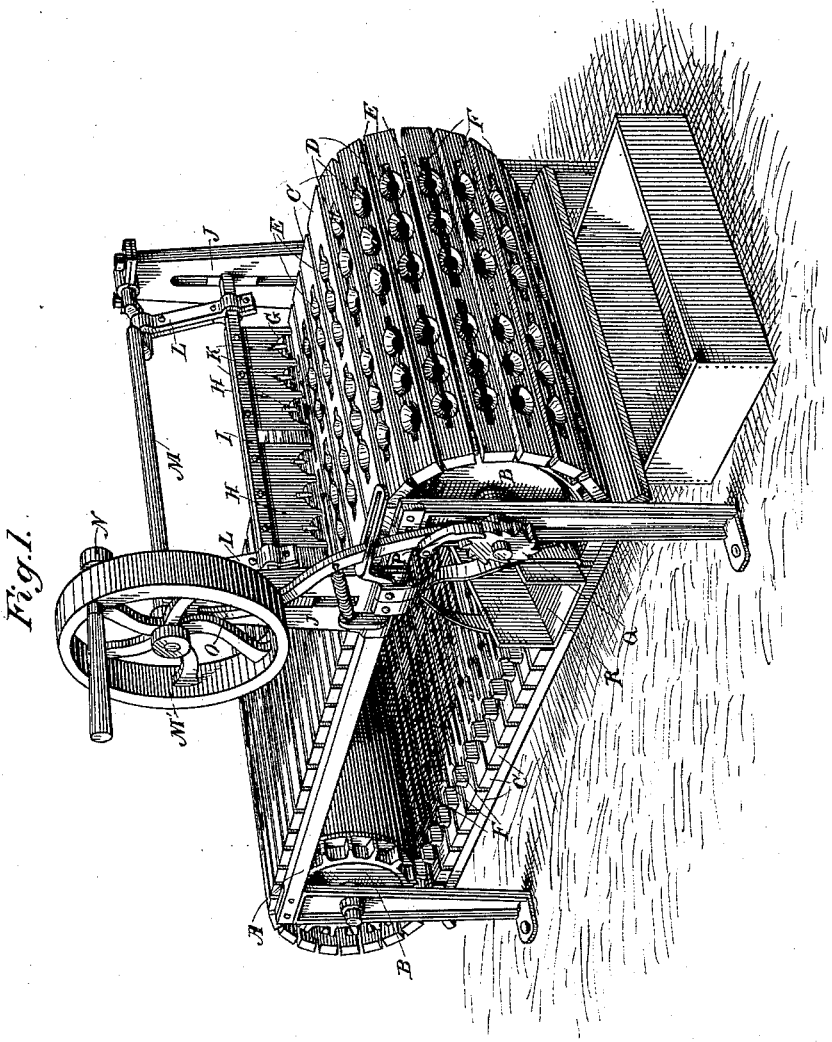

(No Model.) 2 Sheets—Sheet 1.

J. G. BRIGGS & F. CAVALLARO.
FRUIT PITTER.

No. 397,691. Patented Feb. 12, 1889.

Witnesses,
Geo. H. Strong.
J. B. Hourse,

Inventors,
John G. Briggs
Frank Cavallaro.
By Dewey & Co.
atty (No Model.) BEST AVAILABLE COPY 2 Sheets—Sheet 2.
J. G. BRIGGS & F. CAVALLARO.
FRUIT PITTER.
No. 397,691. Patented Feb. 12, 1889.
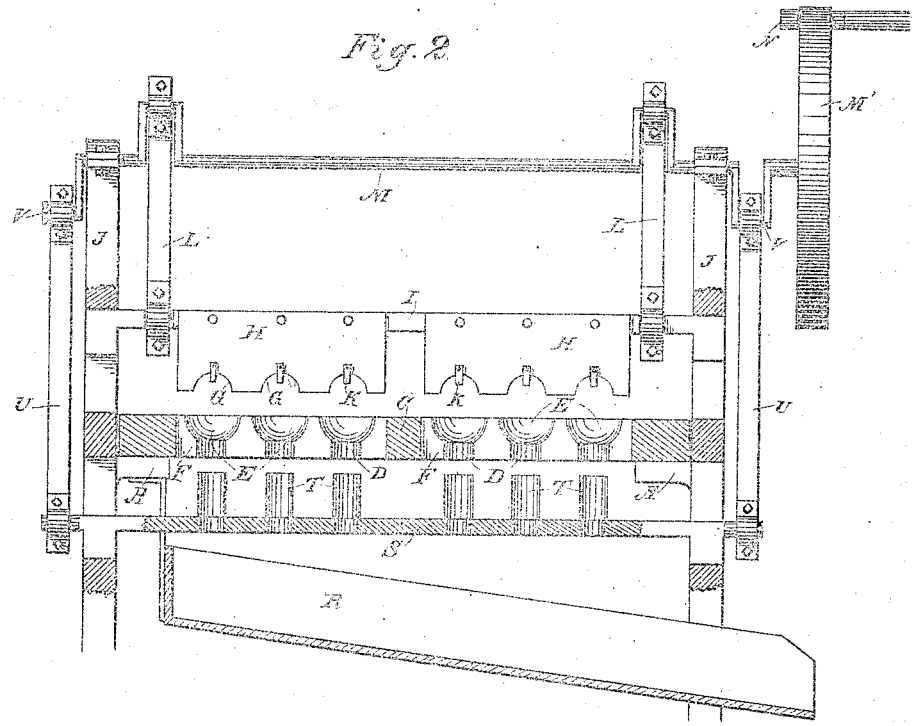
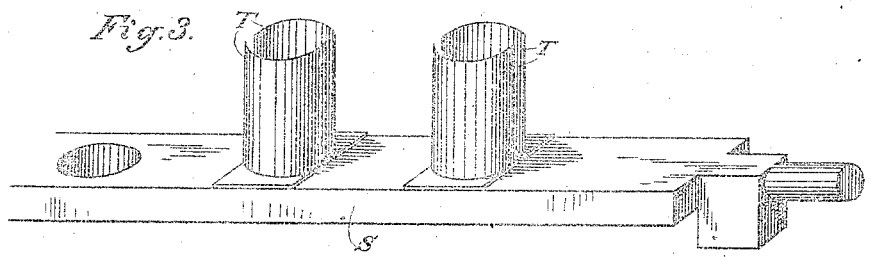

UNITED STATES PATENT OFFICE.

JOHN G. BRIGGS AND FRANK CAVALLARO, OF SAN JOSÉ, CALIFORNIA; SAID CAVALLARO ASSIGNOR OF ONE-HALF HIS RIGHT TO A. S. MACKENZIE, OF SAME PLACE.

FRUIT-PITTER.

SPECIFICATION forming part of Letters Patent No. 397,691, dated February 12, 1889.

Application filed September 27, 1888. Serial No. 286,569. (No model.)

*To all whom it may concern:*

Be it known that we, JOHN G. BRIGGS and FRANK CAVALLARO, of San José, Santa Clara county, State of California, have invented an Improvement in Fruit-Pitters; and we hereby declare the following to be a full, clear, and exact description of the same.

Our invention relates to a machine for removing the pits or stones from peaches, plums, and other similar fruits.

It consists of an endless belt formed of transverse slats united together by links, so as to be driven around drums at each end of a horizontal table. These slats have cup-shaped sockets, in which the fruit is received, with holes in the bottoms of the sockets for the escape of the pits, and slots through which vertically-reciprocating knives pass, so as to cut the fruit around the stone, and in combination with this of a punch by which the stone is forced out. The flesh of the fruit is discharged from the end of the machine into a receptacle for the purpose.

It also consists in certain details of construction, all of which will be more fully explained by reference to the accompanying drawings, in which—

Figure 1 is a perspective view of our machine. Fig. 2 shows a modification, parts of it shown in sections. Fig. 3 is a detail view of the lower bar.

A is a table having a drum, B, at each end. Around these drums chain belts pass, having attached to them transverse slats or strips C, extending the full width of the table, and having their upper surfaces perforated with holes D, which pass entirely through. The upper surfaces have large countersunk or semi-globular depressions E made in them, in which the holes D are central. These depressions are of such size as to receive the peaches, plums, or other fruit from which the stones are to be removed. Transverse slots F are made across these openings for the purpose of admitting the edges of the knives G, by which the flesh of the fruit is cut, so that the stone can be forced out. These knives are in the present case shown in the form of thin steel blades, H, secured to the transverse and vertically-reciprocating bar I, moving in guides J, which rise above the table at each side. The lower edges of the blades are made concave and semicircular, so that when brought down upon the fruit they will make a cut around the stone within the fruit, and in the center of each of the concave blades is a downwardly-projecting spur or point, K, which serves to force the stone out from the hole in the bottom of the depression in which the fruit lies. It will be manifest that as many of these openings may be placed in line as the width of the table will admit, and by this construction a large amount of work can be done with great rapidity. The knives or cutters are caused to reciprocate vertically by means of the pitmen L, extending from the bar I up to the crank-shaft M, which is journaled across the upper ends of the standards or guides in which the ends of the cutter-bar slide. Upon one end of the crank-shaft is fixed a wheel with a crank, by which it may be turned by hand, or it may be driven by power, if desired. In the present case the wheel M' has a roller, N, fixed to it, so that at each revolution this roller will come in contact with the pawl-lever O, thus depressing it, so as to move the pawl P, which engages the ratchet-wheel Q, this being secured to the end of one of the drum-shafts, so that at each revolution of the wheel and reciprocation of the cutting-knives this ratchet and the drum are advanced so as to bring one of the transverse bars beneath the knife with its fruit, so that the knife will act upon it in its next descent.

Beneath the table is a chute, R, into which the pits or stones fall, and by which they are delivered to one side, while in front is a box or receptacle, into which the fruit falls from the depressions when the endless belt passes over the drum at that end.

In some classes of fruit—such as clingstone peaches—it is more difficult to separate the flesh from the stone, and in these cases we employ a bar or table, S, which extends beneath the traveling-belt sections, its ends moving in guides in a similar manner with the cutter-bar I. This bar or table is perforated to correspond with the perforations in the belt-sections above, and each of these perforations is surrounded by curved elastic blades T, which extend upward from the surface of the table a short distance. The ends of this table are connected by pitmen U with the cranks V, formed in the outer ends of the crank-shaft M, above described. These cranks are formed upon the opposite side of the axis from the cranks which operate the reciprocating knives, and it will be manifest that as the knives are brought down and the spurs or points press upon the stone these elastic cutters will at the same instant be brought upward, so that they will pass into the fruit and follow around the stone, opening out by reason of their elasticity, thus separating it from the flesh on the lower side of the peach—a process which would not be necessary in the case of freestone peaches.

Having thus described our invention, what we claim as new, and desire to secure by Letters Patent, is—

1. A fruit-stoning machine consisting of the endless belt formed of transverse bars linked together and drums around which they pass and by which they are driven, said bars having the concave depressions or chambers upon their surfaces, holes through the bottom of the chambers, and slots extending through their sides, in combination with the vertically-reciprocating cutters or knives and the pins or spurs by which the pits are forced out, substantially as herein described.

2. The endless traveling belt formed of transverse bars having concave depressions to hold the fruit, holes through the bottom of each depression for the escape of the stone, and slots extending out at each side, in combination with the vertically-reciprocating concave knives or blades having projecting points or spurs in the center of the arch, substantially as herein described.

3. In a fruit-pitting machine, the endless intermittingly-traveling belt with perforations and concave depressions in the surface, the vertical reciprocating concave knives with central projecting spurs or points, the crank-shaft, and connecting-rods, in combination with the ratchet-wheel, pawl, and actuating mechanism, whereby the belt is moved forward simultaneously with each reciprocation of the knives, substantially as herein described.

4. In a fruit-pitting machine, the endless traveling fruit-carrying belt, the pawl-and-ratchet mechanism by which it is advanced, and the vertically-reciprocating concave knives or cutters with the central projecting points or spurs, in combination with a second bar beneath the belt, mechanism whereby it is caused to reciprocate in the opposite direction from the cutters, and the elastic upwardly-projecting curved knives or cutters fixed to its upper surface, substantially as herein described.

In witness whereof we have hereunto set our hands.

JOHN G. BRIGGS.
FRANK CAVALLARO.

Witnesses:
  THOMAS HARDING,
  F. A. MEINEN.